(12) United States Patent
Carson

(10) Patent No.: US 7,805,764 B1
(45) Date of Patent: Sep. 28, 2010

(54) SEQUENCING DATA BLOCKS TO PROVIDE HIDDEN DATA ON A RECORDING MEDIUM

(75) Inventor: Douglas M. Carson, Cushing, OK (US)

(73) Assignee: Doug Carson & Associates, Inc., Cushing, OK (US)

( * ) Notice: Subject to any disclaimer, the term of this patent is extended or adjusted under 35 U.S.C. 154(b) by 0 days.

(21) Appl. No.: 10/239,328

(22) PCT Filed: Mar. 31, 2000

(86) PCT No.: PCT/US00/08818

§ 371 (c)(1),
(2), (4) Date: Sep. 20, 2002

(87) PCT Pub. No.: WO01/75877

PCT Pub. Date: Oct. 11, 2001

(51) Int. Cl.
*G06F 7/04* (2006.01)
*G06F 17/30* (2006.01)
*H04N 7/16* (2006.01)

(52) U.S. Cl. .................... 726/26; 713/176; 713/193
(58) Field of Classification Search ............. 713/176, 713/193; 726/26, 27, 30
See application file for complete search history.

(56) References Cited

U.S. PATENT DOCUMENTS

| 4,349,499 | A | * | 9/1982 | Johnston | 264/107 |
| 4,531,163 | A | * | 7/1985 | Maerkl et al. | 360/49 |
| 4,562,495 | A | * | 12/1985 | Bond et al. | 360/78.04 |
| 4,602,306 | A | * | 7/1986 | Noda | 720/633 |
| 4,797,812 | A | * | 1/1989 | Kihara | 710/26 |
| 5,195,073 | A | * | 3/1993 | Kato et al. | 369/53.31 |
| 5,436,878 | A | * | 7/1995 | Yamaguchi et al. | 369/47.1 |
| 5,559,884 | A | * | 9/1996 | Davidson et al. | 713/187 |
| 5,572,507 | A | * | 11/1996 | Ozaki et al. | 369/53.21 |
| 5,572,589 | A | * | 11/1996 | Waters et al. | 705/58 |
| 5,602,815 | A | * | 2/1997 | Klappert et al. | 369/59.25 |
| 5,608,713 | A | * | 3/1997 | Akagiri et al. | 369/124.08 |
| 5,657,302 | A | * | 8/1997 | Kato | 369/30.12 |
| 5,661,800 | A | * | 8/1997 | Nakashima et al. | 726/27 |
| 5,661,848 | A | * | 8/1997 | Bonke et al. | 711/112 |
| 5,812,502 | A | * | 9/1998 | Hirai et al. | 369/47.34 |

(Continued)

FOREIGN PATENT DOCUMENTS

EP          0 817 195 A2     1/1998

(Continued)

*Primary Examiner*—David Garcia Cervetti
(74) *Attorney, Agent, or Firm*—Fellers, Snider, et al.

(57) ABSTRACT

Method and apparatus for providing a hidden signature to a recording medium, such as an optical disc (102). The hidden signature is generated in relation to the selected sequencing of data blocks (132, 134, 136, 138, 140, 142). A plurality of mutually exclusive, valid possible states are identified for each of the data blocks (202), each state conforming to requirements set forth by a published standards document to which the optical disc conforms. A different logical value is assigned to each of the possible states, and the hidden signature is selected as a multi-value logical word comprising a sequence of the logical values (204). The hidden signature is thereafter written to the optical disc by writing a set of corresponding data blocks at selected locations on the optical disc having states corresponding to the multi-value logical word (206). The hidden signature thereafter facilitates copy protection or forensic tracking efforts (208).

19 Claims, 5 Drawing Sheets

U.S. PATENT DOCUMENTS

| | | | |
|---|---|---|---|
| 5,856,930 A * | 1/1999 | Hosono | 715/719 |
| 5,883,869 A * | 3/1999 | Tamai et al. | 369/47.32 |
| 5,930,825 A * | 7/1999 | Nakashima et al. | 711/163 |
| 5,940,358 A * | 8/1999 | Kato | 369/30.23 |
| 5,986,980 A * | 11/1999 | Takeshita et al. | 369/30.23 |
| 5,995,457 A * | 11/1999 | Jamail | 369/30.04 |
| 6,072,759 A * | 6/2000 | Maeda et al. | 369/59.25 |
| 6,076,143 A * | 6/2000 | Blumenau | 711/114 |
| 6,091,686 A * | 7/2000 | Caffarelli et al. | 369/53.24 |
| 6,148,139 A * | 11/2000 | Cookson et al. | 386/95 |
| 6,151,665 A * | 11/2000 | Blumenau | 711/162 |
| 6,172,954 B1 * | 1/2001 | Masuda | 369/47.26 |
| 6,177,892 B1 * | 1/2001 | Ko | 341/106 |
| 6,226,770 B1 * | 5/2001 | Barchan | 714/756 |
| 6,243,338 B1 * | 6/2001 | Mine | 369/47.1 |
| 6,342,924 B1 * | 1/2002 | Ikeda et al. | 348/473 |
| 6,363,149 B1 * | 3/2002 | Candelore | 380/45 |
| 6,381,242 B1 * | 4/2002 | Maher et al. | 370/394 |
| 6,389,479 B1 * | 5/2002 | Boucher et al. | 709/243 |
| 6,411,725 B1 * | 6/2002 | Rhoads | 382/100 |
| 6,480,607 B1 * | 11/2002 | Kori et al. | 380/201 |
| 6,510,234 B1 * | 1/2003 | Cox et al. | 382/100 |
| 6,553,129 B1 * | 4/2003 | Rhoads | 382/100 |
| 6,556,679 B1 * | 4/2003 | Kato et al. | 380/203 |
| 6,611,607 B1 * | 8/2003 | Davis et al. | 382/100 |
| 6,636,551 B1 * | 10/2003 | Ikeda et al. | 375/130 |
| 6,687,802 B1 * | 2/2004 | Kori et al. | 711/163 |
| 6,691,229 B1 * | 2/2004 | Nelson | 713/193 |
| 6,728,883 B1 * | 4/2004 | Kohashi et al. | 726/26 |
| 6,778,757 B1 * | 8/2004 | Kawamae et al. | 386/94 |
| 6,785,332 B1 * | 8/2004 | Kutter et al. | 375/240.16 |
| 6,785,815 B1 * | 8/2004 | Serret-Avila et al. | 713/176 |
| 6,802,003 B1 * | 10/2004 | Gross et al. | 713/175 |
| 6,850,619 B1 * | 2/2005 | Hirai | 380/37 |
| 6,928,040 B2 * | 8/2005 | Christensen | 369/53.21 |
| 6,954,856 B1 * | 10/2005 | Kohashi et al. | 713/176 |
| 7,010,685 B1 * | 3/2006 | Candelore | 713/164 |
| 7,039,614 B1 * | 5/2006 | Candelore | 705/57 |
| 7,082,534 B2 * | 7/2006 | Tardo | 713/161 |
| 7,103,181 B2 * | 9/2006 | Ananth | 380/37 |
| 2002/0032691 A1 * | 3/2002 | Rabii et al. | 707/200 |
| 2002/0069389 A1 * | 6/2002 | Sollish et al. | 714/758 |
| 2003/0086566 A1 * | 5/2003 | Gooch | 380/200 |
| 2003/0103645 A1 * | 6/2003 | Levy et al. | 382/100 |
| 2004/0145986 A1 * | 7/2004 | Taylor | 369/53.1 |
| 2007/0016787 A1 * | 1/2007 | Benedikt | 713/176 |

FOREIGN PATENT DOCUMENTS

| | | |
|---|---|---|
| EP | 0 951 019 A2 | 10/1999 |
| WO | WO 99/44196 | 9/1999 |

\* cited by examiner

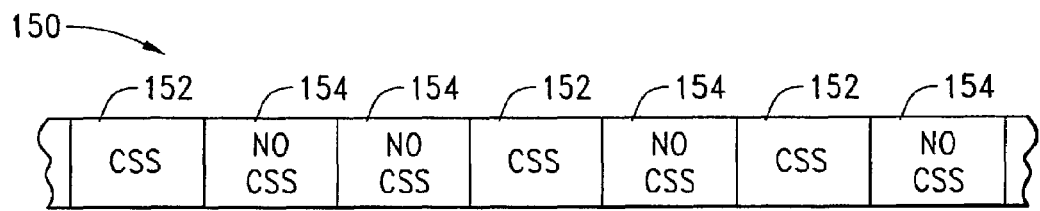
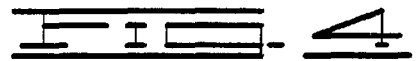
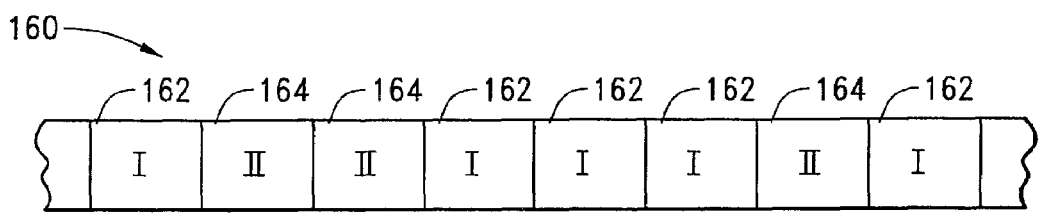
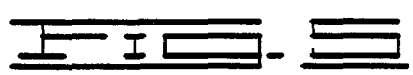
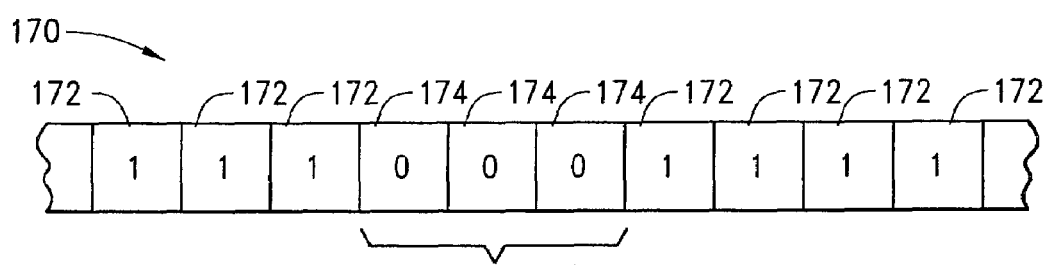
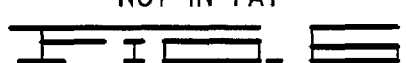
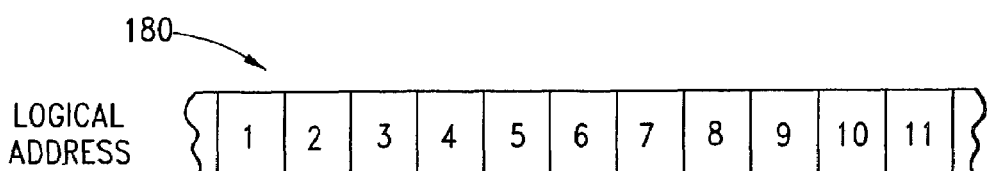
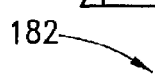
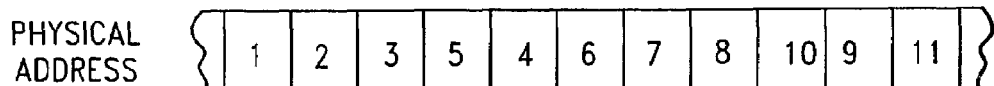
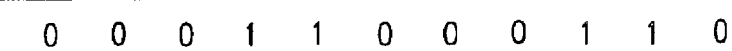
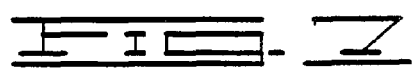

SUBCODE ITEM SEQUENCE

CONTENT TYPE SEQUENCE

SEQUENCING DATA BLOCKS TO PROVIDE HIDDEN DATA ON A RECORDING MEDIUM

FIELD OF THE INVENTION

The present invention relates generally to the field of digital data storage devices and more particularly, but without limitation, to the selected sequencing of data blocks on a recording medium, such as an optical disc, to provide a hidden signature for copy protection, forensic tracking and similar purposes.

BACKGROUND

Optical discs have become increasingly popular as an efficient and cost-effective storage medium for digitally stored data. A typical optical disc comprises a circular disc having a recording layer of light reflective material embedded in a refractive substrate. The recording layer is disposed along a plane substantially normal to an axis about which the disc is rotated and stores data in the form of localized pits and lands (also sometimes referred to as "marks" and "spaces") along a continuously extending spiral track. The length of each pit and land corresponds to one of a selected number of data symbols (for example, from 3T to 11T, with T of determined length).

The data symbols are recovered from the disc through the use of a light source (such as a laser) which applies light of selected wavelength to the rotating disc and a transducer which generates a readback signal indicative of the data in relation to relative differences in reflectivity of the pits and lands. It is common to separate the relative elevations of the pits and the lands by a distance equal to a quarter-wavelength of the applied light so as to facilitate a substantial change in the amount of light reflected by the pits as compared to the amount of light reflected by the lands. Optical disc mastering is discussed, for example, by Published PCT Document WO 99/44196 (PCT Patent Application PCT/US99/04338), assigned to the assignee of the present invention and incorporated herein by reference.

One popular optical disc format is commonly referred to as compact disc, or CD, which has found widespread use in recent years in computer applications (such as CD-ROM) and in the music recording industry (audio CDs). A CD has an outer diameter of 120 millimeters (4.724 inches) and a data storage capacity of about 650 megabytes (MB).

Another popular optical disc format is commonly referred to as digital versatile disc, or DVD. A DVD can be considered a "high-density" CD, in that a typical DVD has generally the same dimensions as a CD, but can store about 4.7 gigabytes (GB) of data per recording layer, due to increased data storage densities through reductions in pit/land geometries and improvements in data encoding and recovery techniques. Accordingly, DVDs can be advantageously utilized as a storage medium for full-length movies (video DVD), computer software (DVD-ROM) and music (audio DVD).

Due to the worldwide consumer demand for the types of information available on optical discs (e.g., software, music and movies), combined with the relative ease with which unauthorized copies of optical discs can be generated, suppliers of optical discs have attempted to implement various copy protection schemes to restrict unauthorized replication of the discs. One type of copy protection involves configuring an optical disc in such a manner so that an authorized copy functions properly in a readback system, but an unauthorized copy is prevented from doing so. Another type of copy protection provides a forensic tracking scheme by storing certain "marking" or "tracking" information on the disc, with this information relating to the source of the disc, the mastering date, and so on. The forensic information does not generally prevent an unauthorized copy from functioning in the readback system, but based on the presence or absence of the information, a determination can be made whether a particular optical disc is in fact an authorized copy.

One particularly common copy protection scheme for CDs involves manipulation of the error correction system. As will be recognized by those skilled in the art, CDs generally utilize three levels of error correction, referred to as C1, C2 and Level 3. The C1 codes are parity words determined from the user data, the C2 codes are error correction codes (ECC, such as Reed-Solomon codes) calculated from the user data and the C1 codes, and Level 3 are top level parity words. These levels of error detection and correction codes are calculated and stored as the user data are written to the discs and each provide successively higher levels of error detection and correction capabilities for the associated user data; if errors cannot be corrected from the C1 codes, the C2 codes are employed, and if the C2 codes are unsuccessful, then the Level 3 parity words are used to correct the errors.

Purposefully writing erroneous ("bad") C2 codes at a few selected locations on the disc will result in a particular disc configuration that would not normally occur during normal C2 calculation steps. Thus, if the optical disc is a CD-ROM, an active application resident in a computer can first check the CD-ROM to ensure that the bad C2 codes are present at the selected locations to verify that the CD-ROM is an authorized copy. If the C2 codes are not bad at the selected locations, the application can report an error and prevent the user from using the CD-ROM.

While operable, there are disadvantages with this type of copy protection approach. Manipulating the error correction system results in some degradation of the error correcting capabilities of the disc, at least potentially making the disc unusable if enough errors arise over time that cannot be adequately corrected using the C1 and Level 3 codes.

Such manipulation also results in optical discs that technically do not meet the various CD industry format standards, and accordingly, the bad C2 codes are easily detectable by standard test equipment used to verify optical disc replicas. Thus, during manufacturing by an authorized replication source the detected errors will be reported for every replicated disc. These reported errors will have to be investigated to determine whether the errors are valid errors, or errors due to the copy protection scheme (and should thus be ignored).

More importantly, because the bad C2 codes are easily detected, an unauthorized source can easily insert bad C2 codes in the appropriate locations in the master disc and defeat the copy protection scheme altogether. Further, since audio CDs do not use a resident computer application that can initially verify the authenticity of the disc, this type of copy protection scheme cannot be readily applied to audio CDs.

DVDs do not use the three level (C1, C2 and Level 3) error correction scheme of CDs; rather, DVDs use a more efficient, two-dimensional (PI/PO) parity calculation scheme to correct readback data errors. While advantageously reducing the amount of disc space required for the error correction scheme (and thereby increasing DVD data storage capacity), it will be recognized that the bad C2 copy protection approach used with CD-ROMs cannot be used with DVDs to provide copy protection. Instead, DVD manufacturers presently use a complex, proprietary copy protection scheme referred to as the Content Scramble System, or CSS.

Different CSS schemes are used for video and audio applications (referred to respectively as "CSS1" and "CSS2"). To date, a CSS scheme has not yet been introduced for DVD-ROM, as CSS is primarily designed to scramble video/audio formatted data, and has not been applied to textual/database formatted data. Basically, CSS uses a variety of keys to scramble and descramble the user data in selected user data blocks. The keys are generated from selected bits stored at various locations on the disc, and these keys are prohibited from being output onto a computer bus, either during the mastering process or during playback of a replicated DVD. Under the current scheme, it is difficult for mastering facilities or replication sources to apply forensic tracking information to replicated DVDs.

Because of these and other considerations, there remains a continued need in the art for an improved copy protection/forensic tracking scheme that can readily be used on a variety of different types of optical discs (including the various CD and DVD audio, software and video formats) in conjunction with, and without interfering with, the operation of existing copy protection schemes (such as CSS). It is to such improvements that the present invention is directed.

SUMMARY OF THE INVENTION

The present invention is directed to providing a hidden signature in a recording medium. Preferably, the recording medium comprises an optical disc formatted in accordance with a published standards document that sets forth requirements regarding the manner in which data are stored on the optical disc to enable processing units from multiple sources to access the data on the optical disc. User data are stored on the optical disc in a plurality of fixed-sized user data blocks which are individually addressable by the processing units to readback the user data. Subcode data used as control information by the processing units are stored in corresponding subcode data blocks.

A hidden signature is written to the optical disc by first identifying a plurality of mutually exclusive, valid possible states for each of a number of data blocks, each state conforming to the requirements set forth by the published standards document. For example, user data blocks can be used with the presence or absence of copy protection encoding (such as DVD CSS encoding), the format type (such as CD-I/XA Format I and II), the inclusion or noninclusion of the user data blocks in a file allocation table, and whether the user data blocks are in correct physical sequence. It will be noted that the states do not relate to the specific contents of the data blocks, but rather to the state, or type, of data blocks (i.e., encoded v. nonencoded, audio v. video, etc.).

Once the states are identified, a different logical value is assigned to each of the possible states, and a hidden signature is selected as a multi-value logical word comprising a sequence of the logical values. The hidden signature is thereafter written to the optical disc by writing a set of corresponding data blocks at selected locations on the optical disc having states corresponding to the multi-value logical word. In this way, the hidden signature can thereafter be accessed to facilitate authentication and forensic tracking efforts.

Because the hidden signature can be readily implemented in a way that does not violate industry standard format specifications, the hidden signature is not detectable by standard test equipment used to verify replicated discs, and therefore is not easily detected and defeated. Hidden signatures that will typically disappear upon remastering are particularly suitable for use in copy protection schemes (i.e., schemes that reject access to non-authenticated discs). Hidden signatures that will typically remain on the disc after remastering are particularly suitable for forensic tracking purposes (i.e., ability to determine, from examination of the disc, information relating to the original mastering of the disc, ownership rights to the contents, etc.).

These and various other features and advantages which characterize the present invention will be apparent from a reading of the following detailed description and a review of the associated drawings.

BRIEF DESCRIPTION OF THE DRAWINGS

FIG. 4 illustrates the manner in which a hidden signature is preferably written to a DVD in relation to the ordering of CSS encoded and non-encoded data blocks.

FIG. 5 illustrates the manner in which a hidden signature is preferably written to a CD through the selected ordering of CD-I, XA Format I and II data blocks.

FIG. 6 illustrates the manner in which a hidden signature is preferably written to an optical disc in relation to the ordering of user data blocks that are either assigned or not assigned in a file allocation table associated with the optical disc.

FIG. 7 illustrates the manner in which a hidden signature is preferably written to an optical disc in relation to a threading order algorithm.

DETAILED DESCRIPTION

Figure 1:
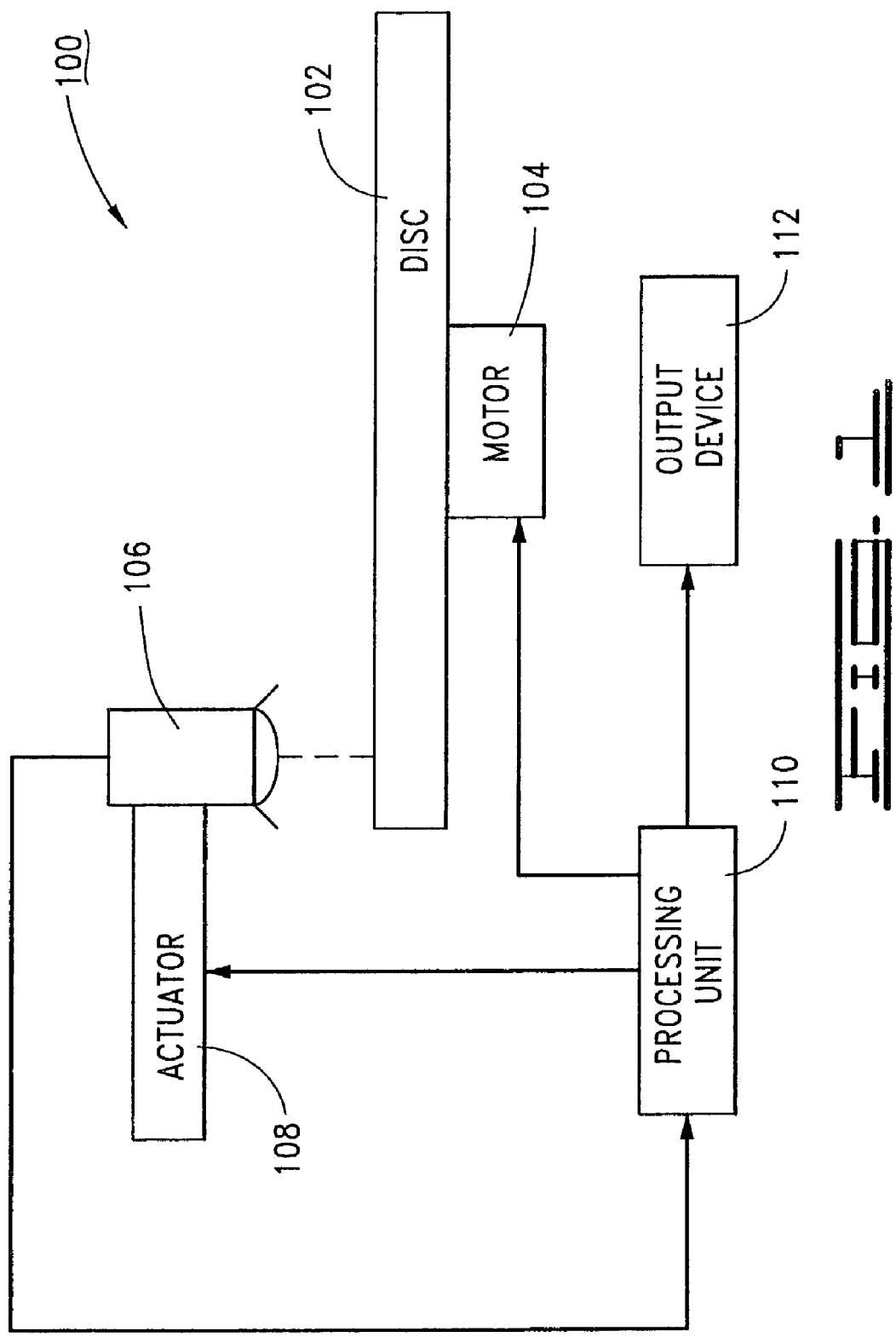
FIG. 1 provides a functional block diagram of an optical disc readback system.

In order to set forth various preferred embodiments of the present invention, reference is first made to FIG. 1, which provides a functional block diagram of an optical disc readback system 100 used to readback and output user data from an optical disc 102. The optical disc 102 can be any one of the various types of optical discs commercially available now or in the future, including the various CD and DVD formats used to store audio, software or video information. It is contemplated that the optical disc 102 includes a hidden signature formed in a manner discussed below.

The optical disc 102 is rotated by a motor 104 and accessed by an optical transducer 106 (such as a laser device) which is positioned radially with respect to the disc 102 by a linear actuator 108. Data transduced by the transducer 106 are provided to a processing unit 110, which processes the data to provide output signals to an output device 112.

By way of example, if the optical disc 102 stores computer software (such as a CD or DVD ROM), the processing unit 110 can represent an optical disc reader in a personal computer and the output device 112 can represent a video monitor that displays the operation of the software to the user. If the optical disc 102 stores video information (such as a full-length movie on a video DVD), the processing unit 110 can represent a video player and processor/tuner and the output device 112 can represent a television and a set of speakers. If the optical disc 102 stores audio information (such as audio CD or DVD), then the processing unit 110 can represent an audio disc player and processor/tuner and the output device 112 can represent a set of audio speakers. It will be understood that the foregoing examples are merely illustrative in nature and are not limiting to the present invention.

Figure 2:
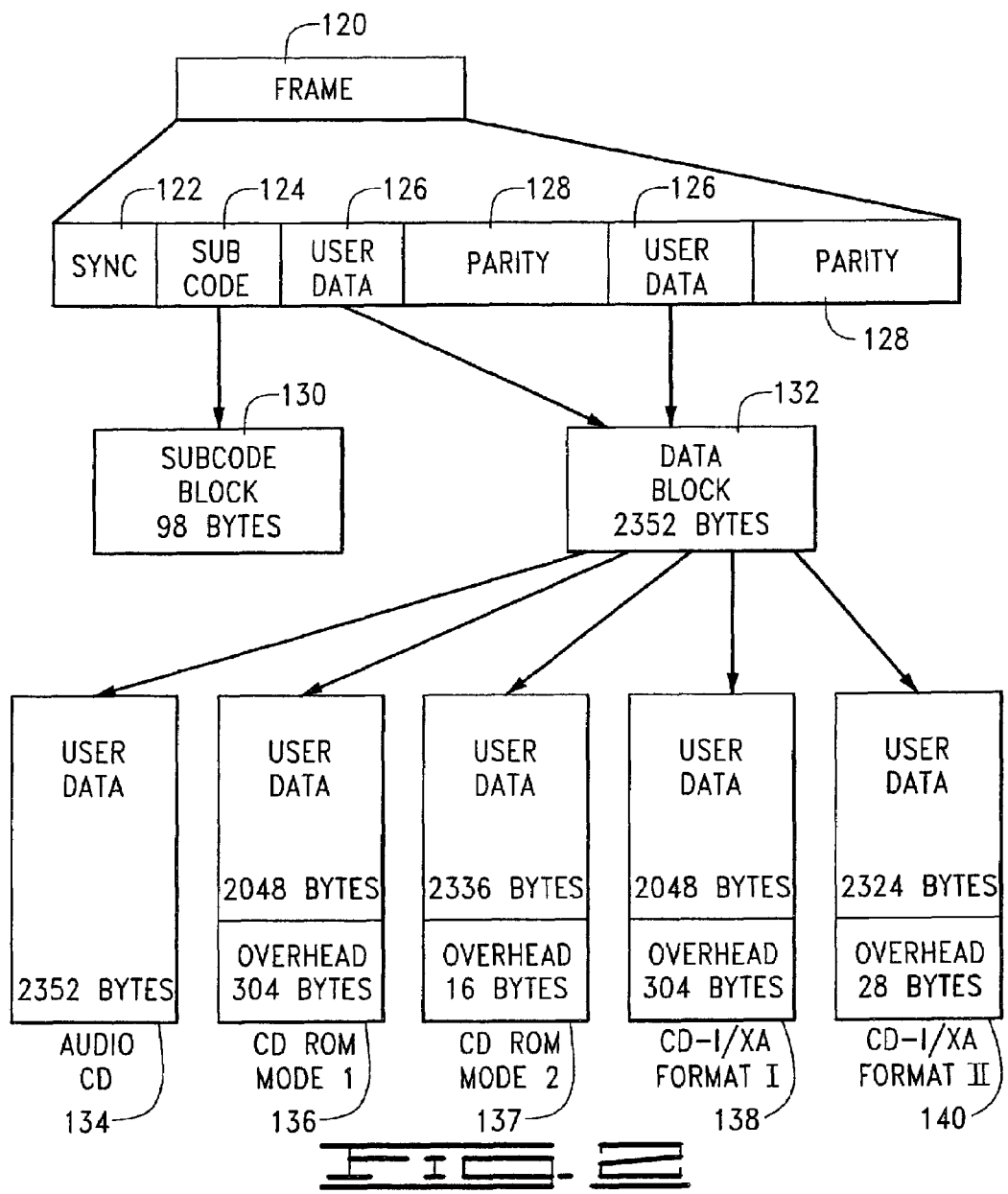
FIG. 2 illustrates the formats for typical compact disc (CD) data blocks.

Regardless of type, data are stored on the optical disc 102 in a series of data blocks that are arranged across the surface of the optical disc 102 (such as in a number of concentrically disposed tracks, or in a single, spiral track). FIG. 2 illustrates the general manner in which these data blocks are stored on a typical CD.

In accordance with the industry standard "Red Book" (generally corresponding to CEI/IEC-908), data are arranged on a CD in a series of frames (one of which is represented at 120). Each frame 120 comprises a synchronization (sync) field 122, a subcode field 124, user data fields 126 and parity fields 128. The sync field 122 provides synchronization information to the processing unit 110, the subcode field 124 stores control information, and the parity fields 128 store the aforementioned C1 words used to correct errors in the user data in the user data fields 126. Generally, each frame 120 includes 24 bytes of user data, 1 byte of subcode and 8 bytes of error correction codes.

A total of 98 successive frames make up what is referred to as a block. For reference, the motor 104 (FIG. 1) is rotated so that 75 blocks are read per second by the transducer 106. A typical CD thus has a total storage capacity of about 330,000 blocks.

Each of these blocks includes a subcode block 130, which stores 98 bytes of subcode information, and a data block 132 (also referred to as a user data block and a data sector), which stores 2352 bytes. In this way, a CD comprises two data channels: a main channel from which the desired output is extracted for the user (using the data blocks 132), and a subchannel that provides control information to the processing unit 110 (from the subcode blocks 130).

The actual amount of user data stored in each user data block 132 depends on the format of the CD. As shown in FIG. 2, an audio CD data block 134 provides 2352 bytes of user data. In other words, the entire data block comprises user data (i.e., digitized audio information). A mode 1 CD-ROM data block 136, on the other hand, provides 2048 bytes of user data and 304 bytes of overhead bytes. The 2048 bytes of user data comprise actual programming used by the processing unit 110 (such as software programming steps or data files) and the remaining 304 bytes of overhead comprise header, sync, error correction (the aforementioned C2 and Level 3 words), and addressing information. A mode 2 CD-ROM data block 137 provides 2336 bytes of user data and only 16 bytes of overhead bytes. These formats are in accordance with the well-known "Yellow Book" standard (CEI/IEC-10149).

Formats referred to as CD-Interactive (CD-I) and CD-Extended Architecture (CD-XA) are also shown in FIG. 2. Such are in accordance with the "Green Book" and provide interactive video and audio outputs. These are arranged into two formats: Format I and Format II, shown respectively at 138 and 140. As with the CD-ROM data block format 136, the Format I data block 138 has 2048 bytes of user data and 304 bytes of overhead. The Format II data block 140 has 2342 bytes of user data and only 28 bytes of overhead. Of course, other CD formats have been developed, so that it will be understood that the formats shown in FIG. 2 have been presented for purposes of illustration and are not limiting to the present invention.

Figure 3:
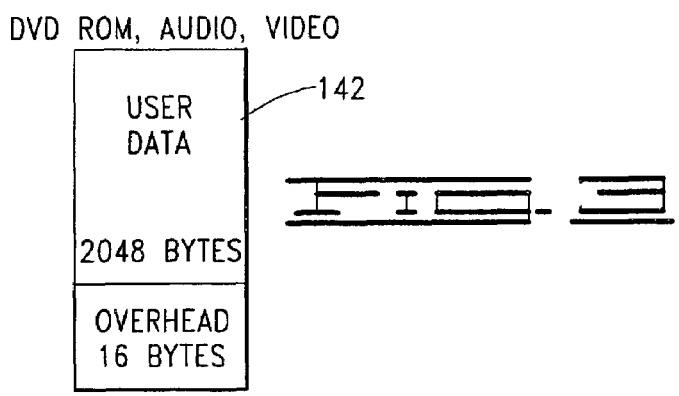
FIG. 3 illustrates the format for typical digital versatile disc (DVD) data blocks.

Unlike CDs, DVDs do not utilize subcode and accordingly, only provide one, main channel of information. As shown in FIG. 3, the information on a DVD (whether audio, video, or software) is arranged into data blocks 142 of 2064 bytes, each of which in turn includes 2048 bytes of user data and 16 bytes of overhead.

The 16 bytes of overhead include address, error detection and correction codes, and a CSS key field from which information is extracted to enable those DVD data blocks 142 that have been CSS encoded (scrambled) to be decoded (descrambled). The particular manner in which DVD data blocks 142 are scrambled and descrambled is held proprietary by those parties who own and enforce the DVD standard, and such details are not necessary to a full understanding of the present invention. It will be sufficient, however, to note that those skilled in the art can readily determine by legal means whether CSS copy protection has been applied to a particular DVD data block 142 by, for example, examining the first bit of the CSS key field.

The present invention, as embodied herein and as claimed below, uses these various considerations to provide a hidden signature on a recording medium, such as an optical disc. Generally, by providing data blocks with two or more known, valid states, each state conforming to an applicable published standards document (i.e., Red Book, Green Book, Yellow Book, DVD Specification, etc.), the sequence of these states can be selected to form the hidden signature that can subsequently be written to the optical disc. Because the states of the data blocks are valid, such will meet the applicable industry format standards and not be readily detectable during verification testing or evaluation by a third party. The hidden signature can be used for copy protection or forensic tracking purposes, as desired. Various examples of valid states for the data blocks on an optical disc will now be discussed.

First, with reference to FIG. 4, the aforementioned CSS encoding scheme will be considered. FIG. 4 shows a portion of a track 150 on the optical disc 102 (FIG. 1) which stores a successive sequence of DVD data blocks (corresponding to the DVD data block 142 in FIG. 3), some which are CSS encoded (identified at 152) and some which are not (identified at 154). For reference, those DVD data blocks which are CSS encoded 152 are represented by a logical "1," while those DVD data blocks which are not CSS encoded 154 are represented by a logical "0."

Since under the present scheme not all DVD data blocks necessarily receive CSS encoding, and there are generally no significant constraints on the relative sequencing of these data blocks, a particular hidden signature can be established using the selected sequencing of the encoded (1) and nonencoded (0) data blocks 152, 154. For example, a particular multi-bit logical word can be formed from a succession of the data blocks at selected locations on the disc to provide the hidden signature. This word can be used for copy protection in a software optical disc by having application data resident in a computer first read and verify the correct word at the selected location on the disc before authorizing use of the disc. Additionally (or alternatively), the signature can be used to store a significant amount of forensic tracking information on the disc.

By accessing the selected data blocks and determining which of the plurality of the valid states for the data block is associated with each data block, the hidden signature can be retrieved and used. The hidden signature does not necessarily need to be formed from adjacent data blocks, but can be dispersed across the disc at a variety of selected, known locations.

Significantly, unless steps are taken by an unauthorized source to meticulously duplicate the order, location and state of every data block on a DVD, unauthorized remastering will generally result in replicated DVDs that do not exhibit the same hidden signature. These replicated DVDs accordingly can be readily detected during subsequent analysis or prevented from operating altogether. Thus, this copy protection scheme provides copy protection for the optical disc over and above that provided by the CSS copy protection encoding scheme, and does not interfere in any way with the CSS copy protection encoding scheme. In this way, disc mastering facilities and disc replication sources can implement proprietary disc authorization routines that are not easily defeatable, and store forensic tracking information that is not easily detectable, while still complying with the requirements of the CSS copy protection encoding scheme.

FIG. 5 provides another example of the plurality of valid states for the data blocks, this time relating to the aforementioned Formats I and II data blocks (138, 140 in FIG. 2) for the CD-I, XA formatted discs. As discussed above, Format I data blocks comprise 2048 bytes of user data, while Format II data blocks utilize 2324 bytes of user data. Both Formats I and II can be readily used on the same optical disc without violating the applicable industry standards (including the Green Book).

Accordingly, FIG. 5 represents a portion of a track 160 with CD-I or XA data blocks that are respectively arranged as Format I (162) and Format II (164). Logical states ("0" and "1") are assigned to these formats, and a hidden signature in the form of a multi-bit logical word from these logical states is selectively written to the disc. As before, the hidden signature will not violate industry standards and will not be readily detectable. The hidden signature can be used in addition to, and will not interfere with, other copy protection schemes such as the "bad C2" copy protection scheme discussed above. Indeed, the use of a layered copy protection scheme involving multiple types of copy protection (such as the "bad C2" scheme in conjunction with one or more hidden signatures established using the scheme presented herein) can advantageously serve to misdirect unauthorized sources into believing that all copy protection efforts have been defeated when, in fact, copy protection remains in effect (or forensic tracking information remains on the disc).

Another example where data block states can be used to generate a hidden signature relates to the use of file allocation tables (FATs). As will be recognized, a FAT identifies each data block used to make up a particular user file, allowing the processing unit 110 (FIG. 1) to retrieve the user data from these data blocks in response to a system call for the file.

Although for purposes of efficiency files are typically stored in successively occurring logical data blocks, it is not necessary that the data blocks be physically adjacent one another. Accordingly, FIG. 6 provides yet another representation of a portion of a track 170, this time having two valid types of user data blocks: data blocks appearing in the FAT, identified by reference numeral 172 and assigned a logical "1," and data blocks that do not appear in the FAT, identified by reference numeral 174 and assigned a logical "0." It will be noted that the nonassigned data blocks 174 are shown to physically reside between adjacent sets of assigned data blocks 172.

During normal access of the associated file, the processing unit 110 will read the assigned data blocks 172 and skip over the nonassigned data blocks 174. However, the user data stored in the nonassigned data blocks 174 can be made to "blend" in with the user data in the adjacent, assigned data blocks 172, so that the location of the nonassigned data blocks can be masked from evaluation. It is significant to note at this point, however, that it is not the informational content of these nonassigned user data blocks 174 that provides the hidden signature, but rather the respective location of the nonassigned user data blocks (in combination with the location of assigned data blocks 172) that forms the hidden signature.

Hence, even the interleaving of data blocks from different files can be used to create the hidden signature; for example, the nonassigned data blocks 174 in FIG. 6 can in fact be actual data blocks used for some other file other than the user data file associated with the user data blocks 172. In each of these cases, remastering will typically result in the reordering of the various data blocks 172, 174, resulting in loss of the hidden signature.

FIG. 7 provides yet another example of the selected ordering of valid states of user data blocks to write a hidden signature to an optical disc. More particularly, FIG. 7 generally illustrates the differences between logical address order (sequence 180) and physical address order (sequence 182) for a series of user data blocks. While the sequence 180 represents the logical order of the data blocks (i.e., the order in which the user data stored therein would be successively output to the processing unit 110), the sequence 182 represents the order in which the data blocks are physically disposed on the disc. It will be noted that a threading order algorithm has been applied to place certain data blocks in physical locations that are "out of order" on the disc 102. Thus, logical states can be readily applied to these two valid types of data blocks (in-sequence and out-of-sequence), such as illustrated in FIG. 7, and used to provide a hidden signature on the disc. Remastering will typically result in the reordering of the data blocks into the logical address order of sequence 180, resulting in loss of the hidden signature. If the order is retained in the remastered disc, the information stored by the hidden signature can readily be obtained from subsequent evaluation of the remastered disc.

The approach of FIG. 7 is deemed particularly useful with audio discs, which typically provide sequential logical access of the contents of the user data blocks. Sufficient buffering is provided to enable selected data blocks to be provided out-of-sequence using a threading order algorithm.

Figure 8:
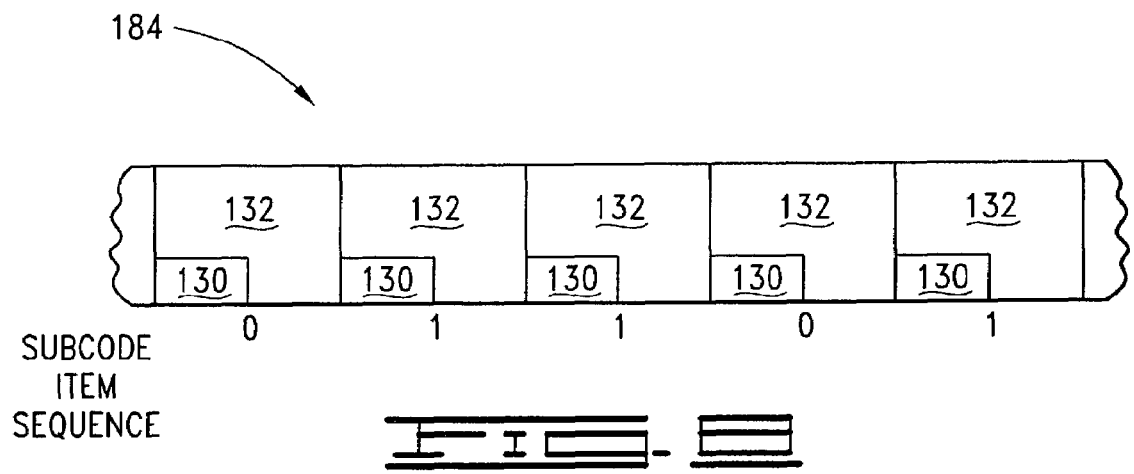
FIG. 8 illustrates the manner in which a hidden signature is preferably written to an optical disc in relation to the ordering of subcode data in each of a plurality of successive subcode blocks.

The foregoing examples have primarily involved the sequencing of user data blocks 132 to provide the hidden signature. FIG. 8, however, provides an example of the use of subcode blocks 130 with different configurations (such as different internal ordering of the various subcode fields) that are selectively sequenced along a track 184 to provide a hidden signature on the disc. As previously discussed, the variations in subcode ordering are permitted by the applicable standards, so that the hidden signature remains undetected during verification testing of the disc.

Figure 9:
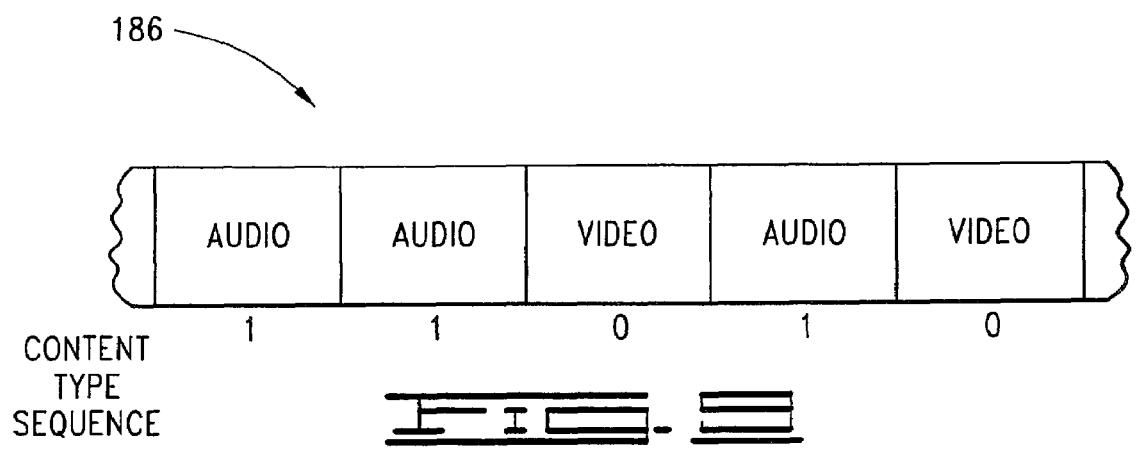
FIG. 9 illustrates the manner in which a hidden signature is preferably written to an optical disc in relation to the type of content in each of a plurality of user data blocks (i.e., whether the data blocks contain video data or audio data).

FIG. 9 provides yet another illustrative example of a hidden signature, in this case pertaining to the type of data stored in each of a plurality of user data blocks (whether "audio" or "video" data) along a track 186. The scheme of FIG. 9 is particularly useful in multimedia disc applications, such as video DVDs which have multiple channels of audio and video data (and hence, various audio and video data blocks). Hence, the selective ordering of specific audio and video data blocks at specific locations on the disc can result in a hidden signature that can be used as the basis of an additional copy protection layer (independent of the CSS copy protection scheme) in a DVD.

Figure 10:
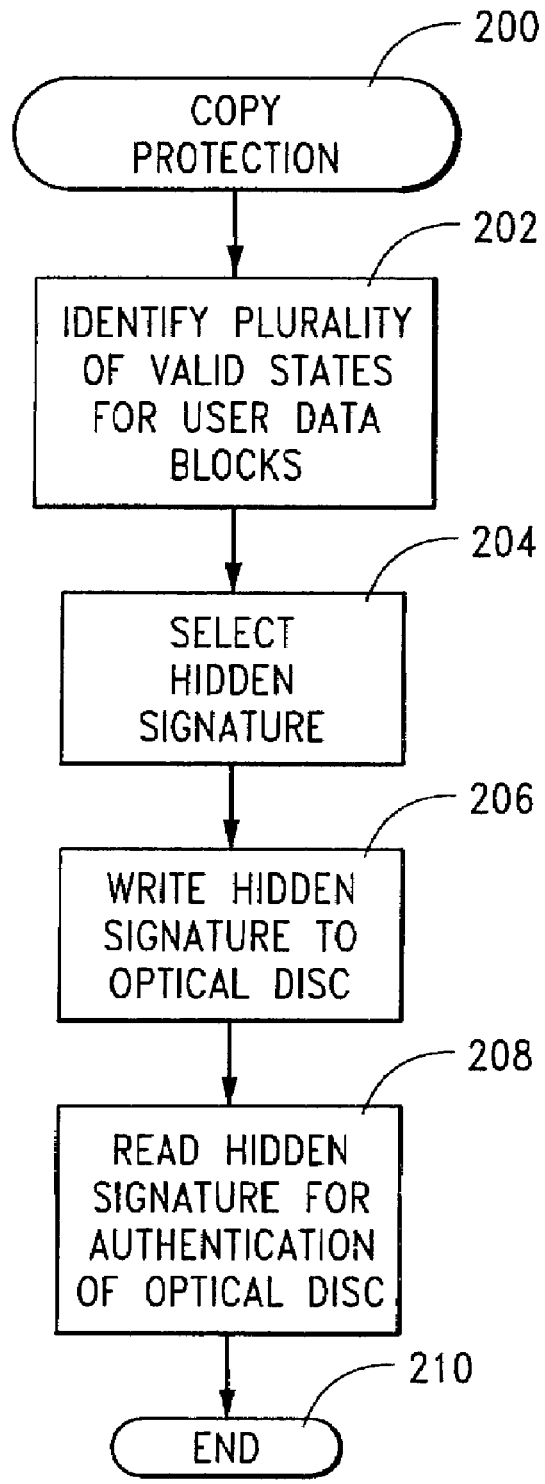
FIG. 10 provides a COPY PROTECTION routine, summarizing the steps carried out in accordance with the preferred embodiments of the present invention to write a hidden signature to an optical disc.

FIG. 10 provides a COPY PROTECTION routine 200, illustrative of the steps carried out in accordance with the various foregoing preferred embodiments to provide a hidden signature on an optical disc.

At step 202, a plurality of valid states are identified for the data blocks that will be used to create the hidden signature. The states will depend in large part upon the particular format of the disc. Illustrative examples include the presence or absence of DVD CSS encoding (FIG. 4), the use of CD-I/XA Format I or II (FIG. 5), the inclusion or noninclusion of the user data blocks in a file allocation table (FIG. 6), whether the user data blocks are in correct physical sequence (FIG. 7), subcode block ordering (FIG. 8) and data block content type (i.e., audio v. video, FIG. 9). While illustrative, the operation of this step is not necessarily limited to these examples. It is important, however, to recall that the states do not relate to the particular contents of the user data blocks, but rather to the status of the user data block itself. Moreover, each of the states are valid, inasmuch as the states are legal and meet the applicable industry standards (unlike, for example, the "bad C2" approach discussed above). Further, the states are preferably selected so that, upon remastering, the particular selection of the states for each of the associated data fields will likely be modified, so that the hidden signature disappears upon remastering. Logical values corresponding to these states are also selected during the operation of step 202.

Once the various valid states are selected for the data blocks, the flow continues to step 204 where a hidden signature is selected as a combination of the valid states identified in step 202. For example, if two valid states are identified in step 202 and these states are assigned logical values of 0 and 1, then the operation of step 204 preferably comprises identification of a suitable multi-bit word formed from a selected number of the data blocks. The location of each bit in the multi-bit word is also selected at this time.

At step 206, the data are next appropriately conditioned so that the hidden signature is written to the optical disc during the normal data write operation. This can occur either during an optical disc mastering process (wherein a master is generated for large scale optical disc replication) or during the direct writing of a disc with a writeable format (such as CD-W, CD-R/W, etc.). It is contemplated that this step can include the writing of the data followed by selection of the hidden signature from the resulting ordering of selected data blocks on the disc, so that the hidden data pattern is determined by the mastering process itself.

Step 208 shows the subsequent readback of the hidden signature as the relevant data blocks are read. This can include operations such as disc authentication during initial disc access, or forensic evaluation of the optical disc to ensure the disc is an authentic copy or to determine source information regarding the disc. The routine then ends at 210.

In view of the foregoing, it will now be recognized that the present invention is directed to an apparatus and method for writing a hidden signature to a recording medium, such as an optical disc. In accordance with preferred embodiments, an optical disc 102 is formatted in accordance with a published standards document that sets forth requirements regarding the manner in which data are stored on the optical disc to enable processing units 110 from multiple sources to access the data on the optical disc. Such published standards documents include, but are not limited to, the aforementioned Red Book, Yellow Book, Green Book, Orange Book, DVD Specification, etc., each of which define the manner in which data are arranged onto an optical disc, allowing processing units from different manufacturers (sources) to properly readback the data stored thereon.

Data are stored on the optical disc in a plurality of fixed-sized data blocks, such as user data blocks which are individually addressable by the processing units to readback the user data. Such user data blocks are shown, for example, in FIGS. 2-3, such as the 2352 byte size used in CDs and the 2064 byte size used by DVDs.

The hidden signature is written by first identifying a plurality of mutually exclusive, valid possible states for each of the data blocks, each said state conforming to the requirements of the published standards document. A different logical value is assigned to each of the possible states. These operations are exemplified by step 202 in FIG. 8. A hidden signature is next selected as a multi-value logical word comprising a sequence of the logical values, as exemplified by step 204. The hidden signature is then written to the optical disc, step 206, and subsequently readback for authentication of the optical disc, step 208.

The steps set forth in the appended method claims are provided in a particular order, but the scope of the claims will not necessarily be limited to such order.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

The invention claimed is:

1. A method comprising:
providing a plurality of data blocks each storing a selected amount of user content;
assigning a first logical value to a first type of data block of the plurality of data blocks with a first type of user content, and assigning a second logical value to a second type of data block of the plurality of data blocks with a second type of user content different from the first type, wherein the first and second types of user content are independent of block addresses;
forming a multi-bit hidden signature from the first and second logical values;
storing the first and second types of data blocks of the plurality of data blocks in a data storage memory in a sequence corresponding to the hidden signature; and
using a processing unit to output the first and second types of data blocks in the plurality of data blocks from the data storage memory in said sequence, wherein presence of the hidden signature in said output sequence authenticates the plurality of data blocks.

2. The method of claim 1, wherein the storing step comprises writing the plurality of data blocks to an optical disc.

3. The method of claim 1, wherein the first type of content comprises content to which copy protection has been applied to provide an encoded block, and wherein the second type of content comprises content to which copy protection has not been applied to provide an unencoded block.

4. The method of claim 3, further comprising using the processing unit to detect the sequence and to grant access to the plurality of data blocks when the detected sequence corresponds to the hidden signature.

5. The method of claim 3, wherein the sequence of encoded and unencoded blocks of the using step are successively disposed along a data track on a storage medium.

6. The method of claim 3, wherein each of the plurality of data blocks comprises an encoding field, wherein each of the encoded blocks has a first value in the associated encoding field indicating that copy protection has been applied thereto, wherein each of the unencoded blocks has a second value in the associated encoding field indicating that copy protection has not been applied thereto, and wherein the method further comprises accessing the respective encoding fields of the encoded and unencoded blocks in said sequence to detect the hidden signature.

7. The method of claim 3, wherein the copy protection comprises Content Scramble System (CSS) encoding.

8. The method of claim 1, wherein the first type of content of the assigning step constitutes audio data so that the first type of data block comprises an audio block, and wherein the second type of content of the assigning step constitutes video data so that the second type of data block comprises a video block.

9. The method of claim 8, further comprising detecting the sequence of the audio and video blocks, and granting access to the plurality of data blocks when the detected sequence corresponds to the hidden signature.

10. The method of claim 8, wherein the sequence of audio and video blocks of the outputting step are successively disposed along a data track on a storage medium.

11. The method of claim 10, wherein the first type of content of the assigning step comprises CD-ROM mode 1 data, and wherein the second type of content of the assigning step comprises CD-ROM mode 2 data.

12. The method of claim 1, wherein the copy protection encoding applied during the selectively applying step comprises Content Scramble System (CSS) encoding.

13. A method comprising:
selectively applying copy protection to a plurality of data blocks stored in a memory to provide encoded blocks to which copy protection encoding has been applied and unencoded blocks to which copy protection encoding has not been applied;
assigning a first logical value to the encoded blocks and a second logical value to the unencoded blocks;
forming a multi-bit hidden signature from the first and second logical values; and
using a writing system to write the encoded and unencoded blocks to a storage medium in a sequence corresponding to the hidden signature.

14. The method of claim 13, further comprising accessing the storage medium to detect the sequence of the encoded and unencoded blocks, and granting access to data stored in the encoded and unencoded blocks when the detected sequence corresponds to the hidden signature.

15. The method of claim 13, wherein the sequence of encoded and unencoded blocks of the writing step are successively disposed along a data track on the storage medium.

16. The method of claim 13, wherein each of the plurality of data blocks comprises an encoding field, wherein each of the encoded blocks has a first value in the associated encoding field indicating that copy protection has been applied thereto, wherein each of the unencoded blocks has a second value in the associated encoding field indicating that copy protection has not been applied thereto, and wherein the method further comprises accessing the respective encoding fields of the encoded and unencoded blocks in said sequence to detect the hidden signature.

17. A method comprising:
providing input data in a plurality of data blocks stored in a memory;
assigning a first logical value to first data blocks of the plurality of data blocks, wherein each of the first data blocks comprises a user data field that provides a first type of user content and an overhead field that provides a first code associated with the first type of user content;
assigning a second logical value to second data blocks of the plurality of data blocks, wherein each of the second data blocks comprises a user data field that provides a second type of user content different from the first type of user content and an overhead field that provides a second code associated with the second type of user content different from the first code, and wherein the first and second codes are independent of block addresses of the associated first and second data blocks;
forming a multi-bit hidden signature from the first and second logical values;
storing the first and second data blocks from the plurality of data blocks in a memory in a sequence corresponding to the hidden signature;
using a processing unit to read the first and second data blocks of the plurality of data blocks from the data storage memory in said sequence;
utilizing the processing unit to detect the hidden signature from the first and second codes of the data blocks read during the using step and to grant an output device access to the data blocks when the hidden signature is detected.

18. The method of claim 17, wherein at least a selected one of first and second types of user content comprises audio data or video data.

19. The method of claim 17, wherein the memory of the storing step comprises an optical disc, and wherein the processing unit reads the optical disc during the using step.

* * * * *